United States Patent [19]

Dowell, Jr. et al.

[11] 3,928,653

[45] Dec. 23, 1975

[54] COLLAGEN SLURRY CONTAINING PARTIAL FATTY ACID ESTERS OF GLYCERIN

[75] Inventors: Arthur M. Dowell, Jr.; Arthur L. Reitemeier, both of Danville, Ill.

[73] Assignee: Tee-Pak, Inc., Chicago, Ill.

[22] Filed: Feb. 5, 1975

[21] Appl. No.: 547,300

[52] U.S. Cl. ............... 426/657; 426/140; 426/277; 426/278; 426/652
[51] Int. Cl.$^2$ .......................................... A23L 1/31
[58] Field of Search .......... 426/105, 135, 138, 140, 426/277, 278, 330, 652, 657

[56] References Cited
UNITED STATES PATENTS

| | | | |
|---|---|---|---|
| 3,535,125 | 10/1970 | Facan | 426/277 |
| 3,627,542 | 12/1971 | Cohyl et al. | 426/140 |

*Primary Examiner*—Hyman Lord
*Attorney, Agent, or Firm*—Paul Shapiro; Joseph E. Kerwin; William A. Dittmann

[57] ABSTRACT

This invention relates to an improvement in a process for preparing a collagen slurry suitable for the manufacture of edible collagen sausage casing which comprises comminuting a collagen source for forming a collagen pulp, swelling the collagen pulp with an acid for releasing fibrils therefrom, and mixing the swollen collagen pulp with water for forming a slurry; and to the resulting slurry. The invention resides in the discovery that slurries made with a collagen source having a fat content below about 8 percent by weight of the collagen can be improved in terms of casing manufacture by adding and blending a partial fatty acid ester of glycerin to the pulp prior to swelling in an amount effective for selectively reducing the fiber clumps in the slurry.

11 Claims, No Drawings

LUBRICANT ADDITIVES

This is a division, of application Ser. No. 342,088, filed Mar. 16, 1973, and now abandoned.

This invention relates to certain novel compounds useful as lubricant additives and more particularly to certain dithiophosphate compounds useful, inter alia, as antioxidants and as antiwear additives.

Metal salts of dithiophosphoric acids, particularly O,O-dialkyl dithiophosphoric acids, have been very widely used for many years as antioxidant and antiwear additives in lubricants. The most commonly used salts are the zinc salts, although other salts such as nickel and cadmium salts have also been proposed. The zinc dialkyl dithiophosphates have been widely used because of their very desirable combination of properties. As well as being very efficient antioxidants and useful antiwear additives, they are comparatively inexpensive due to their ready preparation from commonly available materials. In addition they have comparatively good oil-solubility and their use does not lead to excessive bearing weight loss.

Nevertheless, one important disadvantage of the foregoing additives is that the metal content forms ash as the metal salts are consumed in service. Consequently, numerous attempts have been made to prepare dithiophosphate derivatives which are ashless additives, i.e. contain no metal, yet retain the desirable combination of properties of the metal dithiophosphates. Such attempts have produced ashless additives comparable in antioxidant properties with zinc dialkyl dithiophosphates, yet corrosion of composite metal, e.g. copper-lead bearings, remains a problem.

We have now found certain dithiophosphate compounds which are useful additives. These compounds, or at least the preferred species thereof, are oil-soluble antioxidant additives, comparable in efficiency with zinc dialkyl dithiophosphates, which also inhibit excessive bearing weight loss.

Accordingly the present invention provides a compound, suitable for use as an oil-soluble, ashless, lubricant additive, which compound has the general formula:

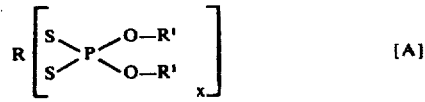

[A]

wherein:
1. R is the residue of a monocyclic, non-conjugated olefin containing from 8 to 12 carbon atoms and at least two ethylenically unsaturated double bonds in the ring, and optionally bearing one or more alkyl, alkoxy or hydroxy groups on the ring, or is the residue of the product formed by reacting at least one, but not all, of the ethylenically unsaturated double bonds in such a monocyclic, non-conjugated olefin with sulphur, phosphorus pentasulphide, a mercaptan, phenol, thiophenol, thiocyanate anion or carboxylic acid;
11. each of $R^1$ is the same or different and is an organic group; and
iii. $x$ is an integer of 1, 2 or 3, preferably 1 or 2.

The present invention further provides a process for preparing novel compounds in accordance with the present invention, which process involves reacting a di-(organo) dithiophosphoric acid and a monocylic, non-conjugated olefin containing from 8 to 12 carbon atoms and at least two ethylenically unsaturated double bonds in the ring, and optionally bearing one or more alkyl, alkoxy or hydroxy groups on the ring.

The present invention also includes the products of the foregoing process. In the process it is possible for some molecular rearrangement to occur and the resulting products are also included within the present invention. It is also possible to prepare products comprising a mixture of mono-bis- and tris-dithiophosphates within the present invention.

The two organic moieties present in each molecule of dithiophosphoric acid, from which moieties the group $R^1$ of general formula [A] are derived, can be chosen in accordance with the criteria commonly adopted in dithiophosphate additives. That is to say the organic moieties should be of sufficient size and sufficiently hydrocarbon in nature to impart the desired degree of oil-solubility. However, the organic moieties desirably should not be so large that the phosphorus and sulphur content of the additive is undesirably small, in terms of weight, as this creates a need for large dosage weights to be used in lubricants in order to impart the required degree of antioxidant and antiwear properties. Within the foregoing criteria, one may select the organic moieties from among the very wide variety of organic groups known in the art as suitable for inclusion in dithiophosphoric acids. Thus the organic moieties may be alkyl, alkenyl, aryl, alkaryl or aralkyl groups, and optionally may bear one or more unreactive substituents such as alkoxy groups.

Preferably each organic moiety is an alkyl, phenyl or alkyl-substituted phenyl group. The alkyl substituted phenyl group may contain from 7 to 18 carbon atoms. Most preferably, however, each organic moiety is an alkyl group containing from 3 to 10 carbon atoms. The two organic moieties may be the same. Alternatively, a mixture of organic moieties can be employed by using a dithiophosphoric acid containing two different organic groups and/or by using a mixture of two or more different dithiophosphoric acids.

As is well known in the art dithiophosphoric acids may be prepared by reacting hydroxy-substituted organic compounds, for example alcohols, phenols, alkyl substituted phenols or mixtures thereof, with phosphorus pentasulphide in approximately 4 to 1 molar ratio.

The olefin employed in the foregoing process preferably contains two or three ethylenically unsaturated double donds in the ring. As hereinbefore described the olefin may bear an alkyl or alkoxy substitutent, as for example in the compounds described in U.K. Pat. Specification Nos. 1,248,592 and 1,248,593, having the formula:

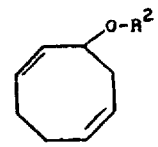

wherein $R^2$ is an alkyl group. For the purposes of the present invention $R^2$ may contain from 1 to 20, preferably 8 to 16, carbon atoms.

Alternatively, the olefin may bear one or more hydroxy substituents on the ring. Such substituted olefins may be prepared by reacting the unsubstituted olefin in known manner using, for example, potassium permanganate, hydrogen peroxide or a peracid such as performic or peracetic acid, as oxidising agent or by forming, and then hydrolysing, the epoxide of the olefin.

However, it is preferred that the olefin does not bear any alkyl, alkoxy or hydroxy substituents, the most preferred olefin being a non-conjugated cyclooctadiene or cyclododecatriene.

Reaction of the di-(organo) dithiophosphoric acid with the monocyclic, non-conjugated olefin takes place over a wide range of temperatures, for example from ambient temperature to 200°C., but a preferred reaction temperature is from 50° to 150°C. It is particularly preferred to carry out the reaction at a temperature of from 70° to 120°C.

The proportions of the reactants employed may vary from 1 to n moles of dithiophosphoric acid per mole of olefin, wherein n is the number of ethylenically unsaturated double bonds in the olefin, and, at the preferred reaction temperature, the reaction is normally completed within 2 to 50 hours, depending on temperature and the organic substituents in the dithiophosphoric acids. Completion of the reaction may conveniently be considered to have occurred when the acidity of the reaction mixture falls to a constant low level. In a preferred aspect of the invention the reaction is carried out in an inert atmosphere, for example under a nitrogen blanket.

When the proportion of dithiophosphoric acid used is less than that required to react with all ethylenically unsaturated double bonds in the olefin the resulting compounds, containing residual unsaturation, may be employed as lubricant additives. However, in an alternative aspect of the invention the residual unsaturation can be further reacted with compounds known to react with ethylenically unsaturated double bonds to produce further novel compounds in accordance with the present invention. Such compounds reacting with residual unsaturation include sulphur, phosphorus pentasulphide, mercaptans, phenols, thiocyanate anions, thiophenols and carboxylic acids. Specific examples of such compounds are mercaptans and carboxylic acids containing from 1 to 16 carbon atoms; phenol (unsubstituted) and thiophenol (unsubstituted). The foregoing compounds may be reacted with the residual unsaturation at a temperature of from 50° to 200°C and in the case of sulphur, thiocyanates and phosphorus pentasulphide no catalyst is required. In the case of the other compounds, however, it may be desirable to use a catalyst known to promote their reaction with ethylenically unsaturated double bonds, such as mineral acids or Lewis acid catalysts such as boron trifluoride or the etherate or phenolate complex thereof.

When residual unsaturation is further reacted in the above-described manner the resulting products have the same utility, as lubricant additives, as compounds containing residual unsaturation and compounds in which all ethylenically unsaturated double bonds have been reacted with a dithiophosphoric acid.

In yet another alternative some, but not all, of the ethylenically unsaturated double bonds in the monocyclic, non-conjugated olefin may be reacted with the compounds known to react with ethylenically unsaturated double bonds and residual unsaturation reacted with a di-(organo) dithiophosphoric acid, this sequence of reaction steps in general being preferred over the reverse sequence.

In yet another aspect of the invention there is provided a lubricating composition comprising a major amount by weight, based on the total weight of the lubricating composition, of a lubricating oil and a minor amount by weight of the additives of the present invention. In the preferred lubricating compositions the additive constitutes from 0.1 to 10%, more preferably 0.25 to 5%, by weight of the composition and the lubricating oil may be any of the well known mineral oils of appropriate viscosity characteristics.

It will be understood that the lubricating compositions of the present invention may also contain, if desired, conventional lubricant additives such as ancillary antioxidants and antiwear additives (preferably ashless), corrosion inhibitors, dispersants, particularly disperants of the succinimide type, detergents, thickeners, pour-point depressants and viscosity index improvers. Numerous examples of such conventional additives are described in U.K. Patent Specification No. 1,205,177 and the various documents referred to therein.

The additives of the present invention may also in certain circumstances be conveniently prepared as an additive concentrate consisting of a concentrated solution of a major amount of the additive in a minor amount of mineral oil, or as an additive package consisting of a concentrated solution in mineral oil of a major amount of a combination of the additive with one or more conventional additives. Such concentrates and packages are frequently very convenient forms in which to handle and transport additives and are diluted with further quantities of oil, and optionally blended with further additives, before use.

The present invention will now be illustrated with reference to the following examples:

EXAMPLE 1

S-Dihydro cyclododecatrienyl-O,O′-di isobutyl dithiophosphate

Reaction:

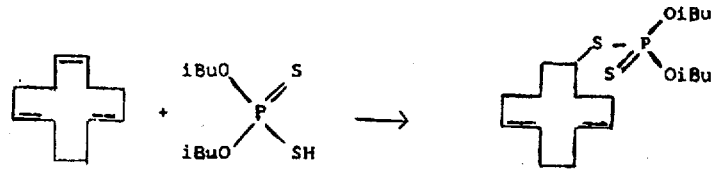

where the addition may be in the 1, 5 or 9 position.

O,O′-di-isobutyl dithiophosphoric acid (0.5 mole) was placed in a round-bottomed 3-necked flask fitted with stirrer, condenser and nitrogen cover, thermometer and dropping funnel and cyclododeca-1,5,9-triene (0.5 mole) added thereto by dropwise addition via the dropping funnel. The reaction mixture thus formed was heated on a water bath, the latter being heated to 100°C (reaction temperature about 90° to 95°C.), for a total of 10½ hours at which time the acidity of the reaction mixture had fallen to a constant low level.

The crude reaction product was worked up by the addition of petroleum ether of Boiling Point 62°–68°C.

EXAMPLE 1 PREPARATION OF COLLAGEN PULP

Selected cattle hides from carcasses certified fit for human consumption, weight about 65 – 75 pounds each, are washed in a large volume of circulating cool (10°C.) water to remove adhering blood. After washing, the hides are flushed without curing to remove adhering fatty and muscular debris from the flaying operation.

The washed and fleshed hides are treated by immersing the hides in a liming bath consisting of a saturated solution of calcium hydroxide containing about 5 percent solid particulate calcium hydroxide in about 0.5 percent sodium sulfhydrate for about 3 – 12 hours to effect partial dehairing of the hide.

After liming, the hides are removed from the liming bath and allowed to drain for a period of about one-half hour. The limed hides are gently squeezed between rubber rollers to remove excess liming liquor. The hides then are cut and split in the plane of the hide into two approximately equal portions by weight. The upper or outer hide surface contains all of the hair, hair follicles, and sebaceous and sudorific glands. The inner or corium layer consists essentially of collagen. The outer or hair containing layer is discarded as unsuitable for use in the preparation of casing but may be used for the formation of leather laminates or other coverings.

The corium splits normally are packed in a saturated lime solution and stored at temperatures preferably below about 5°C. until processed. Storage in the lime solution is advantageous to prevent bacterial growth. A storage period sometimes is anywhere from 1 – 12 weeks or longer.

To prepare the hides for use in the manufacture of collagen casing, the corium splits are first washed with water to remove surface lime. Washing with water is continued until a liquor pH of about 7 is obtained after the liquor has been in contact with the hide for about 20 minutes.

The hides are delimed by the Burke process described in U.S. application Ser. No. 517,277 filed Oct. 22, 1974 by converting the lime to a water-soluble salt. Deliming is effected by tumbling or agitating the splits with a dilute aqueous solution, e.g., 0.5 percent lactic acid, having a pH of from about 4 – 5.5. Deliming of the hide is continued for about 20 hours at which time the acid end point in the center of the hide has a pH of 5.5 or lower. The pH end point is conveniently measured by phenol red.

After deliming, the hides are thoroughly washed with water to remove substantially all of the water-soluble calcium salts. Washing of the hide is continued for about 4 hours and completed only when the supernatant, when in contact with the hide for about 20 minutes, has a pH of 6.7 or is within about 0.1 pH units of the pH of the incoming water wash. The hides are chopped and comminuted, either through a meat grinder or a high speed rotary impellor-knife combination, for reducing the collagen to a pulp.

EXAMPLE 2

Three hide samples are prepared in accordance with Example 1. After washing, the hides are comminuted as follows. Sample 1 is chopped in a chopper until the hides pass through a 50 mm. square opening screen. Sample 2 is chopped in accordance with Sample 1, except that it is chopped sufficient for passing through a 30 mm. square opening screen. Sample 3 is prepared in accordance with Samples 1 and 2, except that it is chopped sufficiently for passing through a 12 mm. square opening screen. All of these samples are passed for final comminution through a meat grinder conventionally used in the production of collagen casing. After passing the respective samples through final comminution for forming a collagen pulp, the samples are analyzed for fat content, i.e., triglyceride. Sample 1 has a fat content of 7.4 percent by weight of the collagen. Sample 2 has a fat content of 0.7 percent by weight of the collagen. Sample 3 has a fat content of 3.9 percent by weight of the collagen.

The collagen pulp after being analyzed for fat content is mixed with water to produce a mixture consisting of about 90 – 95 percent water by weight. The balance is collagen. This mixture then is treated with sufficient dilute lactic acid (2 percent lactic acid in water) for producing a pH of 2.5 – 3.7. The pulp then is stored overnight or approximately 6 – 10 hours at a temperature of about 3°C. for effecting swelling of the collagen and release of the collagen fibrils. At the end of the soaking period, the collagen in Sample 1 has swollen completely and taken up almost all of the water. Samples 2 and 3 do not absorb the water or swell as completely as Sample 1. Additional water is mixed with the swollen collagen samples to produce a slurry containing about 4 percent collagen and 1.2 percent lactic acid. The pH of the slurry is adjusted to about 2.5 – 3.7. These slurries then are passed through a bar filter having a clearance of about 0.016 inches, a high speed mixer, and then through a two-stage homogenizer operated at about 900 psi in the first stage and 600 psi in the second stage for forming extrudable slurries.

Each of the extrudable slurries are evaluated by spreading a layer of the slurry over a glass plate and viewing the layer. Criteria used in judging slurry quality considers the number of fiber clumps in the layer, the size of the fiber clumps, and the hardness of the clump. Experience has shown that good slurries suited for making collagen casing have few fiber clumps in the layer or film or, if fiber clumps are present, they are soft and readily broken. Poor slurries, on the other hand, have a greater frequency of fiber clumps or the fiber clumps are large and hard. Often, the fiber clumps are larger than one-eighth inch in diameter. Hardness of the clump is determined by the optical integrity of the clump and generally hard clumps are optically uniform whereas the soft clumps show graduation in optical properties from the center to the edge. Sample 1 is evaluated and determined to be of good quality. Sample 2 is determined to be of extremely poor quality having a large number of fiber clumps which are large and hard in the center. Sample 3 is determined to be of intermediate quality having fewer fiber clumps than Sample 2 but yet more than is found in Sample 1. Based on experience, it would appear that the Sample 1 slurry would be better suited for the manufacture of collagen casing in terms of estimated productivity.

EXAMPLE 3

Five batches of a standard collagen pulp are prepared in accordance with the procedures used in preparing the collagen pulp in Example 1 and subsequently converted an extrudable slurry as described in Example 2. These five batches are analyzed, after comminuting, for fat content. These batches have a fat content of 5.3 percent based on the weight of the collagen. Slurries made with three of these batches caused the bar filter to plug. Plugging of the filter indicates that the batches have a substantial proportion of fiber clumps in the slurry and may cause trouble later in the manufacturing of casing.

Five additional batches are prepared in accordance with the same procedure used above in preparing the five standard batches above except that 1.5 percent D-2-2245 sold by the Glidden-Durkee Division of SCM Corporation based on the weight of the collagen is added and mechanically blended with the collagen pulp. Blending is continued until the D-2-2245 is substantially uniformly mixed with the collagen pulp. Durkee's D-2-2245 is a mixture of mono and diglycerides of oleic acid having a monoglyceride content of about 46 percent, a diglyceride content of about 46 percent, and the balance consisting essentially of triglycerides of oleic acid and fatty acids. The resulting fat content of the five batches, including the mixed mono and diglycerides, is 8.1 percent by weight of the collagen. Slurries made from the collagen pulp can be passed through the bar filter without plugging. This shows that the slurries containing the mixed mono and diglycerides have fewer or softer fiber clumps than the standard batches. Based on this observation, it is expected that the slurry will process nicely and have a better yield than the slurries made with the standard collagen pulp.

The two sets of slurries comprising five batches each are pumped under pressure through an annular extrusion die into a coagulating bath, tanned, plasticized, and dried in accordance with conventional commercial techniques for the manufacture of edible collagen casing. Example 1 of the Burke application having Ser. No. 517,277 and a filing date of Oct. 23, 1974 is exemplary of a commercial technique. The average yield of casing for the five standard batches containing the lower fat content, i.e., 5.1 percent, is about 78 percent of the theoretical yield.

On the other hand, the batches having the mixed mono and diglycerides added have a productivity yield of 90 percent based on the theoretical yield of collagen input.

This example shows that the addition of the mixed mono and diglycerides to the collagen pulp and mixing therewith prior to swelling with acid improves the quality of slurry in terms of its filterability and in terms of its productivity based on casing manufactured from the slurry.

EXAMPLE 4

Six batches of collagen pulp are prepared in accordance with the procedure used in preparing Sample 2 in Example 2. Dur-EM 104 sold by the Glidden-Durkee Division of SCM Corporation is added and blended with each of the six batches of collagen pulp in an amount sufficient to raise the fat content, including the Dur-EM 104, to at least 8 percent by weight based on the collagen. The target concentration of fat plus Dur-EM 104 is 10 percent by weight of the collagen. Durkee's Dur-EM 104 is a mixture of mono and diglycerides of oleic acid having a capillary melting point of from about 115° – 120°F. The batches of collagen plus Dur-EM 104 are converted to casing in the same manner as the batches in Example 3. The productivity of the casing, based on the collagen input, is above average based on a comparison with slurries processed by the same method without the Dur-EM 104 addition.

EXAMPLE 5

A 1 percent addition of Durkee's D-2-2245 is added and blended with several batches of collagen pulp prepared in accordance with the method of Example 1. The batches are not analyzed for fat content. The purpose of the 1 percent addition of D-2-2245 is to determine the effectiveness of a blanket addition of D-2-2245 to collagen pulp in terms of the yield of casing produced. Above average yields are noted from slurries made by the addition of 1 percent D-2-2245 to the collagen pulp as compared to collagen slurries not incorporating Durkee's D-2-2245. It is also noted that there are fewer problems associated with filtering the slurry thus showing that there are fewer fiber clumps than is normally expected from slurries made with non-treated collagen pulp.

We claim:

1. In a process for preparing a slurry comprising edible collagen and water for extrusion into an artificial sausage casing by comminuting a collagen source for forming a collagen pulp;

swelling said collagen pulp with an edible acid for releasing the collagen fibrils; and mixing said collagen pulp in water for forming a slurry;

the improvement for reducing fiber clumps in said slurry and improving the productivity of the casing made from such slurry which comprises adding to said collagen pulp prior to swelling and blending therewith a partial fatty acid ester of glycerin, said partial fatty acid ester of glycerin being added in an amount effective for selectively reducing said fiber clumps.

2. The process of claim 1 wherein said partial fatty acid ester of glycerin is added to said collagen pulp is a proportion of at least 0.5 percent by weight of the collagen.

3. The process of claim 2 wherein said partial fatty acid ester of glycerin is added in an amount sufficient to raise the fat and emulsifier content, based on the collagen, to about 6 – 10 percent by weight.

4. The process of claim 3 wherein said fatty acid portion of said partial fatty acid ester of glycerin has from about 14 – 18 carbon atoms.

5. The process of claim 4 wherein said partial fatty acid ester of glycerin is a mixed mono and diglyceride of oleic acid.

6. The process of claim 5 wherein said mixed mono and diglycerides of oleic acid has from about 40 – 50 percent monoglyceride, 35 – 50 percent diglyceride, about 0 – 25 percent triglyceride, and not more than a minor proportion of fatty acid.

7. In a collagen slurry suited for the manufacture of artificial sausage casings which comprises a dispersion of an acid swollen collagen pulp and water, the improvement which comprises a collagen pulp having been mixed and blended with at least 0.5 percent of a partial fatty acid ester of glycerin prior to swelling with said edible acid.

8. The slurry of claim 7 wherein said partial fatty acid ester of glycerin is added in an amount sufficient to raise the fat and partial fatty acid ester of glycerin content, based on the collagen, to about 6 – 10 percent by weight.

9. The slurry of claim 8 wherein said fatty acid portion of said partial fatty acid ester of glycerin has from about 14 – 18 carbon atoms.

10. The slurry of claim 9 wherein said partial fatty acid ester of glycerin is a mixed mono and diglyceride of oleic acid.

11. The slurry of claim 10 wherein said mixed mono and diglycerides of oleic acid have from about 40 – 50 percent monoglycerides, 35 – 50 percent diglycerides, about 0 – 25 percent triglycerides, and not more than a minor proportion of fatty acids.

* * * * *